(12) United States Patent
Lloyd

(10) Patent No.: US 7,144,080 B2
(45) Date of Patent: Dec. 5, 2006

(54) PORTABLE MASSAGE CHAIR

(76) Inventor: John T. Lloyd, 80926 Turkey Run Rd., Creswell, OR (US) 97426

( * ) Notice: Subject to any disclaimer, the term of this patent is extended or adjusted under 35 U.S.C. 154(b) by 0 days.

(21) Appl. No.: 10/868,166

(22) Filed: Jun. 14, 2004

(65) Prior Publication Data
US 2005/0035644 A1 Feb. 17, 2005

(30) Foreign Application Priority Data
Dec. 13, 2002 (WO) .................... PCT/US02/39967

(51) Int. Cl.
B62J 1/00 (2006.01)
(52) U.S. Cl. .............................. 297/195.11; 297/423.12
(58) Field of Classification Search ........... 297/423.11, 297/195.11, 423.12; 5/620, 622, 623, 638; 403/62, 101, 83, 84; 482/134, 136, 137, 482/138
See application file for complete search history.

(56) References Cited

U.S. PATENT DOCUMENTS

| | | | |
|---|---|---|---|
| 3,067,975 A | 12/1962 | Wilcox | |
| 4,650,249 A | 3/1987 | Serber | |
| 4,662,361 A | 5/1987 | Patterson | |
| 4,746,167 A | 5/1988 | Palmer et al. | |
| 4,971,040 A | 11/1990 | Gillotti | |
| 5,177,823 A | 1/1993 | Riach | |
| 5,215,282 A | 6/1993 | Bonutti | |
| 5,295,728 A | 3/1994 | Schaevitz | |
| 5,304,107 A | 4/1994 | Jones | |
| 5,401,078 A | 3/1995 | Riach | |
| 5,427,436 A | 6/1995 | Lloyd | |
| 5,484,151 A | 1/1996 | Tholkes | |
| 5,487,590 A | 1/1996 | Haynes | |
| 5,538,011 A * | 7/1996 | Craft et al. .................. 128/845 |
| 5,545,177 A | 8/1996 | Coseo | |
| 5,762,402 A | 6/1998 | Gillotti | |
| 5,762,618 A | 6/1998 | Yamanaka et al. | |
| D397,259 S | 8/1998 | Chatani et al. | |
| 5,792,082 A | 8/1998 | Yamanaka et al. | |
| 5,813,727 A | 9/1998 | Sugawa et al. | |
| 5,827,206 A | 10/1998 | Lunter | |
| D402,479 S | 12/1998 | Inada | |
| 5,921,696 A | 7/1999 | Gillotti | |
| 5,971,485 A | 10/1999 | Clark | |
| 6,065,808 A | 5/2000 | Tinsley | |
| 6,543,853 B1 * | 4/2003 | Splane, Jr. .............. 297/423.12 |
| 6,698,831 B1 * | 3/2004 | Lloyd .................... 297/195.11 |
| 6,729,690 B1 * | 5/2004 | Roleder et al. ........ 297/423.12 |
| 2002/0067060 A1 * | 6/2002 | Lloyd .................... 297/195.11 |
| 2002/0171281 A1 * | 11/2002 | Cochran ................. 297/423.11 |
| 2003/0090131 A1 * | 5/2003 | Roleder et al. ........ 297/195.11 |

* cited by examiner

Primary Examiner—Peter M. Cuomo
Assistant Examiner—Sarah B. McPartlin
(74) Attorney, Agent, or Firm—Kolisch Hartwell, P.C.

(57) ABSTRACT

A portable massage chair uses a multi-disk friction clamp to permit adjustment of a chest support member. The chair may be collapsed or set up for use by alternately connecting and disconnecting a rigid triangular support structure formed by a seat support frame portion, a chest support frame portion, and a knee support frame portion.

15 Claims, 9 Drawing Sheets

PORTABLE MASSAGE CHAIR

CROSS-REFERENCE TO RELATED APPLICATIONS

This application claims priority under 35 U.S.C. § 120 of PCT Application No. PCT/US02/39967 filed Dec. 13, 2002 titled "Portable Massage Chair" and is hereby incorporated by reference in its entirety.

This application incorporates by reference in its entirety for all purposes U.S. Provisional Patent Applications Ser. No. 60/340,463, filed Dec. 14, 2001 and Ser. No. 60/380,518, filed May 13, 2002.

FIELD OF THE INVENTION

The invention relates to collapsible chairs, particularly chairs that are adjustable for supporting people of different sizes in position for massage.

BACKGROUND OF THE INVENTION

Chairs are often used to support a person for massage. A typical massage chair supports a person's seat, chest, and head in a forward leaning orientation so that a person's back, shoulders and neck are readily accessible to the masseuse. It is desirable for massage chairs to be adjustable to accommodate people of different heights, and body configurations. Another objective is for massage chairs to be collapsible, portable and light weight. This allows a masseuse to use the same chair to conduct massage at different locations.

Many portable massage chairs have been designed and used in the past. However, there is still a significant need for new chair designs that provide improved adjustment mechanisms, in a lightweight, sturdy, collapsible design that is relatively inexpensive and straight forward to manufacture.

SUMMARY OF THE INVENTION

The invention provides a chair including a seat attached to a front leg structure. A chest support is attached to a rear leg structure and a knee support structure. The front leg structure and the rear leg structure cross at a pivotally connected juncture. The knee support structure is pivotally connected to a lower portion of one of the leg structures. The other end of the knee structure may be removably attached to the other leg structure to form a rigid triangulated support for the chair when it is in the open condition.

The invention also provides a mechanism for permitting adjustability of a support member such as a chest support. The adjustment mechanism uses a clamp on plural frictional locking disks positioned along a common axis. The frictional force between the disks is relieved when the clamp is unlocked. When the clamp is locked, the frictional force between the disks prevents movement between the support member and a related frame structure. A handle is connected to the clamp. The handle is movable between first and second positions to lock and unlock the clamp by applying and relieving pressure. In a preferred embodiment of the invention, the disks include alternating round and square or rectangular disks in a housing that prevents the square or rectangular disks from rotating relative to the frame structure.

DESCRIPTION OF THE PREFERRED EMBODIMENT

Figure 2:
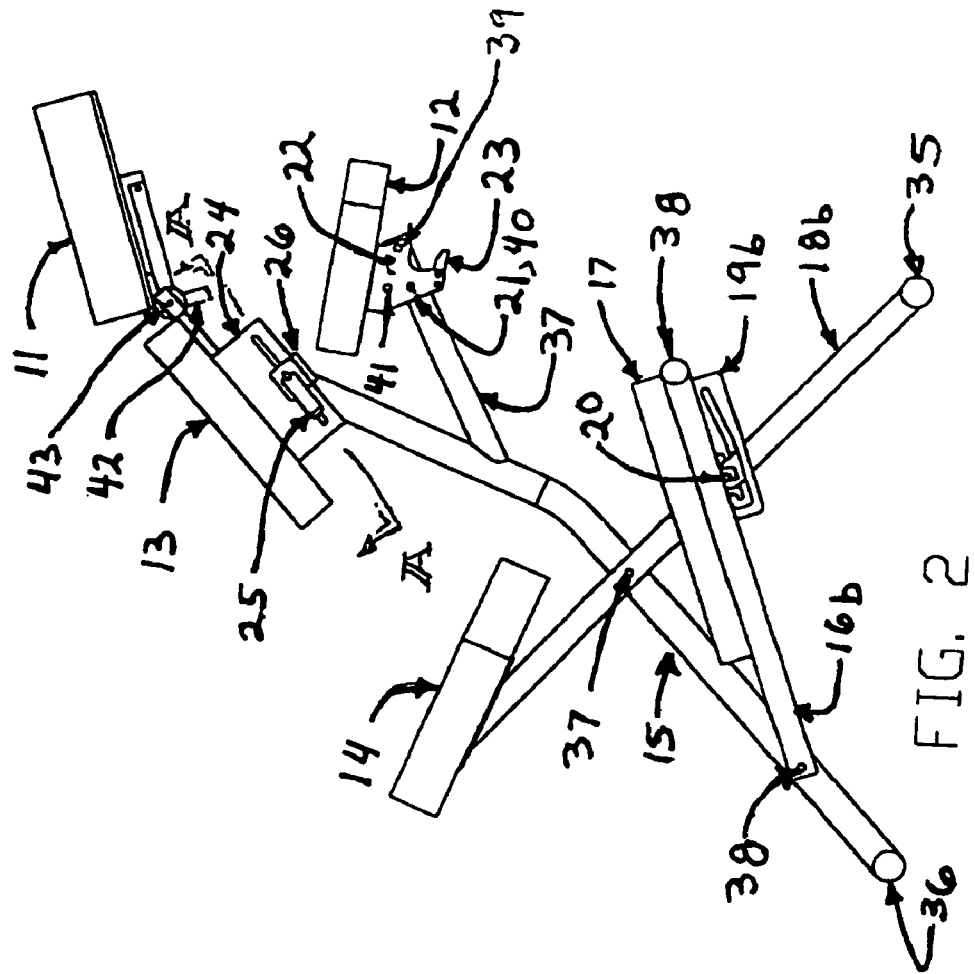
FIG. 2 is a side view of the massage chair of the present invention, shown in the unfolded position.
Figure 1:
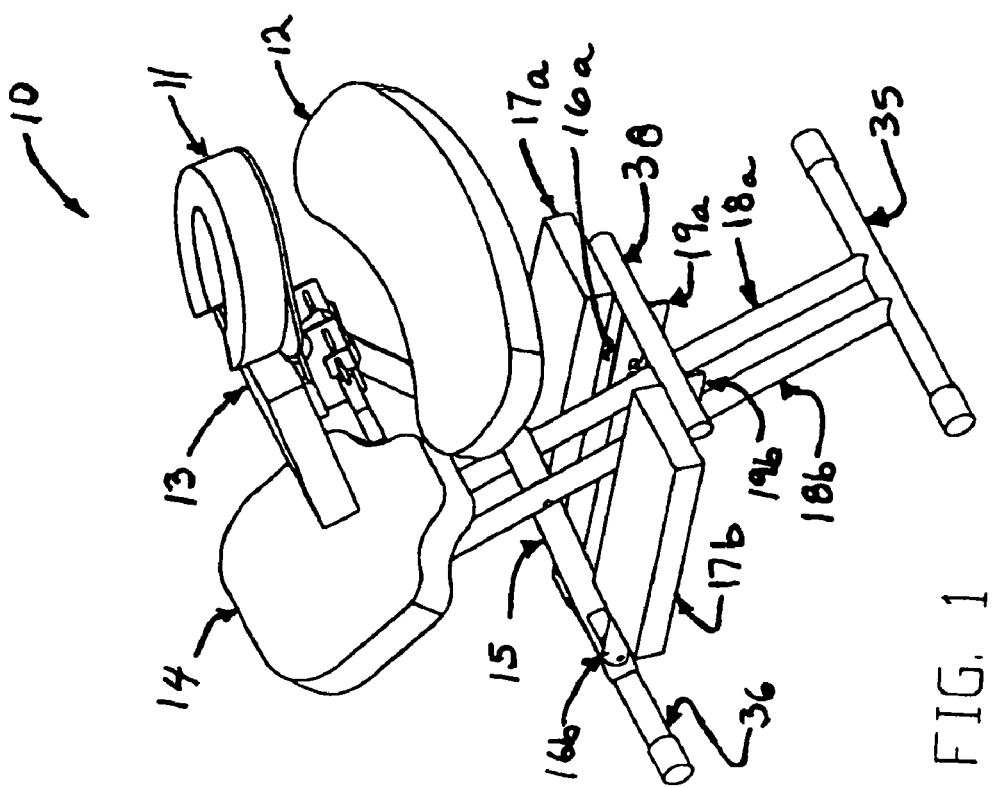
FIG. 1 is a perspective view of the massage chair of the present invention, shown in the unfolded position.

Massage chair 10 accommodates a person (not shown) who would sit in the chair with their buttocks on seat 14, their chest on chest support 13, their face against face rest 11, their forearms resting on arm support 12, and their knees and lower legs on right and left knee rests 17a and 17b.

The chair can be described as being comprised of three subassemblies, a seat subassembly, an upper body support subassembly and a knee and leg support subassembly.

The seat subassembly is comprised of two front leg rails 18a and 18b, which are rigidly attached to front leg cross member 35 and support seat 14 and knee pivot rod 20.

The upper body support subassembly is comprised of main rail 15, which is rigidly attached to rear leg cross member 36 and arm support rail 37. This frame assembly supports chest support 13, face rest 11 and armrest 12.

The knee and leg support subassembly is comprised of knee support rails 16a and 16b, which are rigidly attached to knee support cross rail 38 and guide plated 19a and 19b and pivotally attached to main rail 15 at point 38. This frame assembly supports knee rests 17a and 17b.

The seat subassembly is pivotally attached to the upper body subassembly by main pivot rod 37 allowing the two subassemblies to form an "X" shape. These first two subassemblies are held rigidly in one of three open positions by the knee rail subassembly when knee pivot rod 20 is engaged in one of three hook shaped slots in guide plates 19a and 19b. This causes the three subassemblies to form a rigid triangle connecting pivot points 20, 37 and 38. FIG. 2 shows the knee pivot rod engaged in the center hook shaped slot on guide plates 19a and 19b. When the knee pivot rod is engaged in the forward hook shaped slot the "X" formed by the seat and upper body subassemblies will broaden causing seat 14 to be supported in a lower position. When the knee pivot rod is engaged in the rear hook shaped slot the "X" formed by the seat and upper body subassemblies will narrow causing seat 14 to be supported in a higher position. This allows shorter and taller massage therapists to seat clients at a height that is comfortable for the therapist to work on them. The knee pivot rod 20 can be moved to either of the other two hook shaped slots in guide plates 19a and 19b by pivotally manipulating the knee and leg support subassembly and the seat subassembly about pivot points 38 and 37 respectively.

Figure 3:
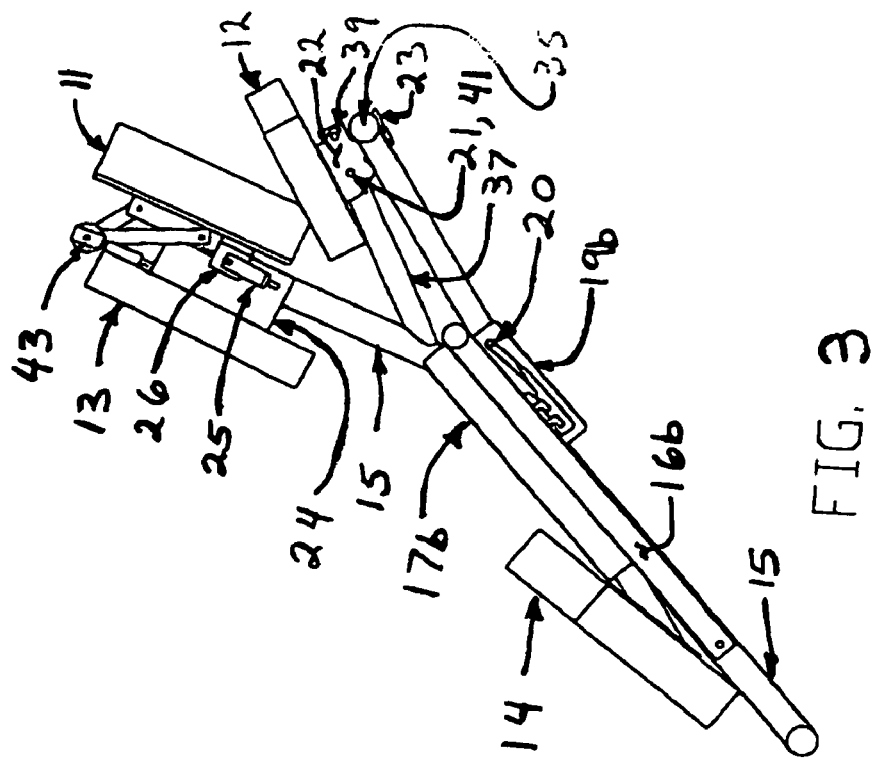
FIG. 3 is a side view of the massage chair of the present invention, shown in the folded position.
Figure 4:
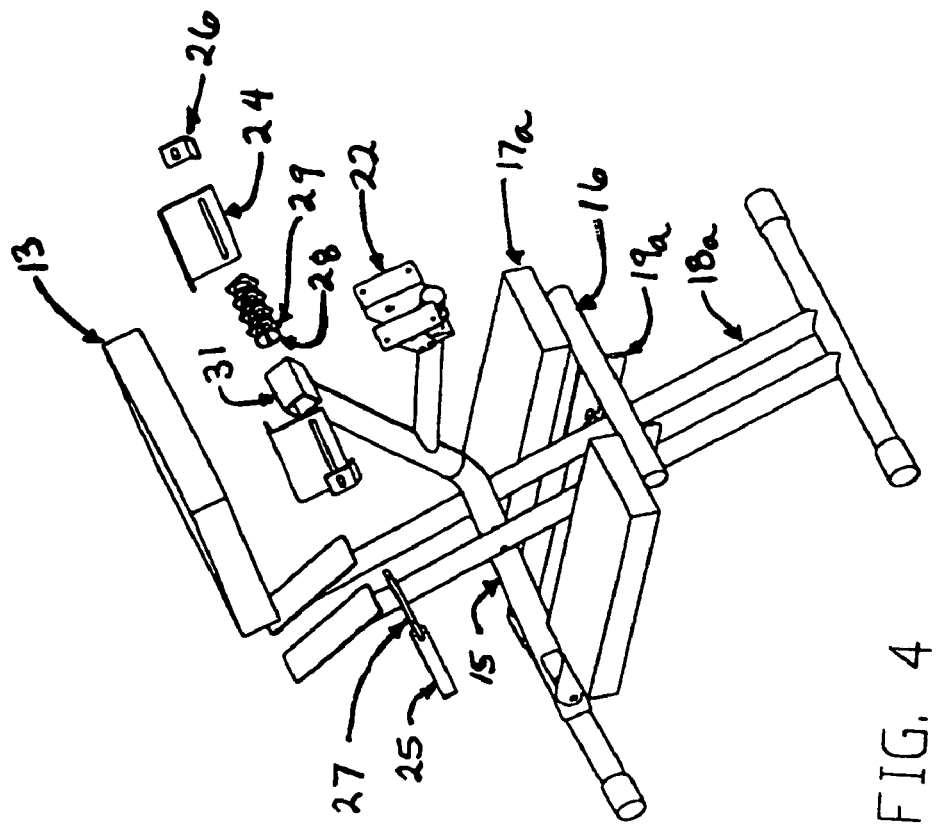
FIG. 4 is a perspective view of the massage chair of the present invention, shown in the unfolded position without the face rest 11 or the arm rest 12 and with the chest support clamping mechanism exploded.

FIG. 3 shows the chair in the folded closed position. The closed position is used to transport and store the chair more easily. The chair is folded by manipulating the seat and knee subassemblies to slide the knee pivot rod 20 to the forward end of the slots in guide plates 19a and 19b. This will bring front leg cross member 35 to contact armrest rail 37 with pawl 23 positioned just below it. Two armrest brackets 22 are pivotally attached to arm rest rail 37 at point 39. Armrest 12 in attached to the top of the armrest brackets 22 and pawl 23 is attached between the lower portion of the brackets. The armrest is held in the open position as shown in FIG. 2 by a spring-loaded button 21 attached to armrest rail 37 engaging in hole 40 in armrest bracket 22. To lock the chair in the folded closed position button 21 is depressed and the armrest brackets and their attached parts are rotated about point 29 until the button 21 is engaged in hole 41. This causes pawl 23 to capture front cross member 35 locking all three subassemblies in the closed position. The chest support and face rest may be further folded into compact closed positions as shown in FIG. 3 by unlocking their respective locking levers 25 and 42, moving them into position and locking the levers. Some compression of the foam of face rest 11 against armrest 12 will occur.

Figure 5:
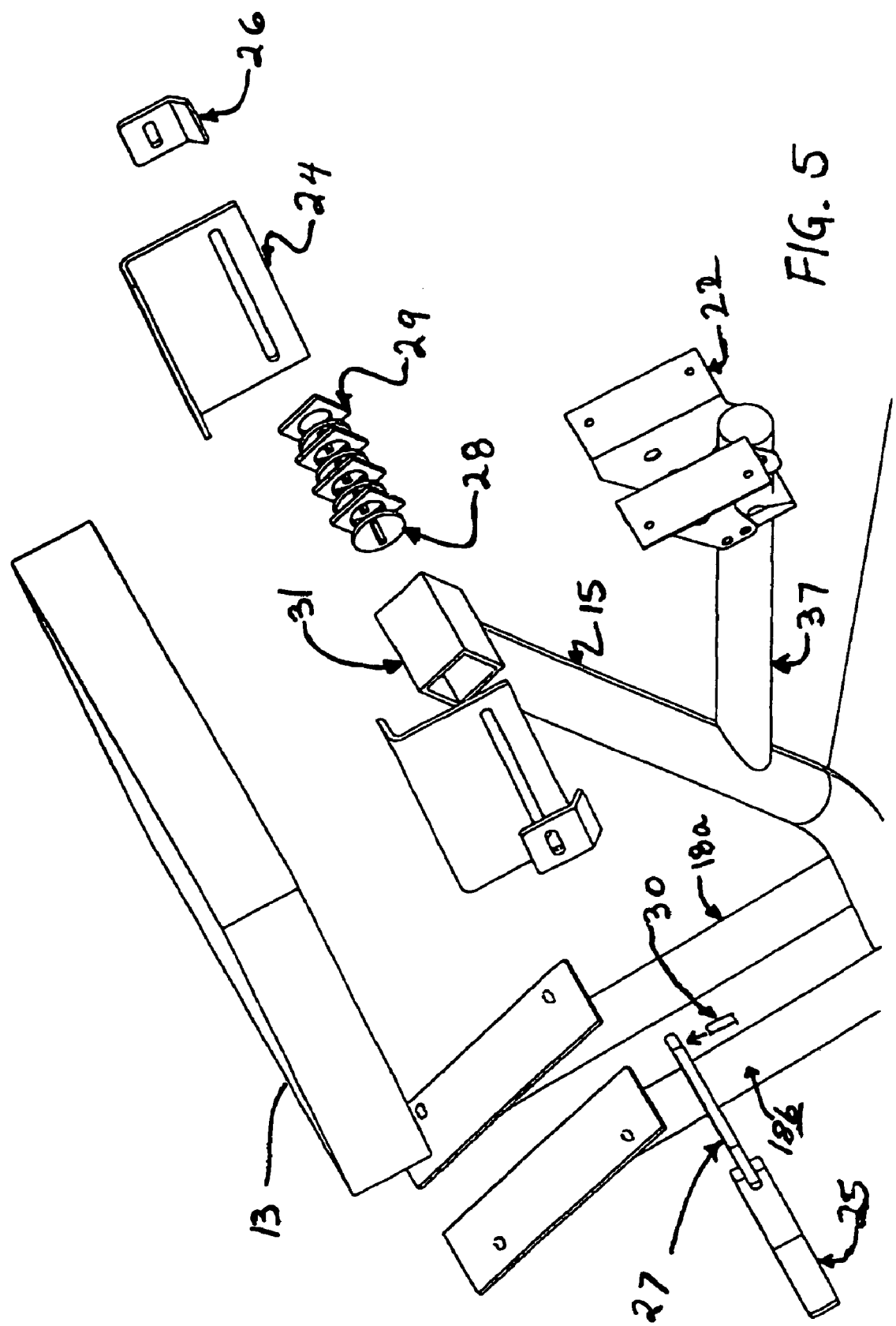
FIG. 5 is a partial enlarged view of a portion of the chair shown in FIG. 4.
Figure 6:
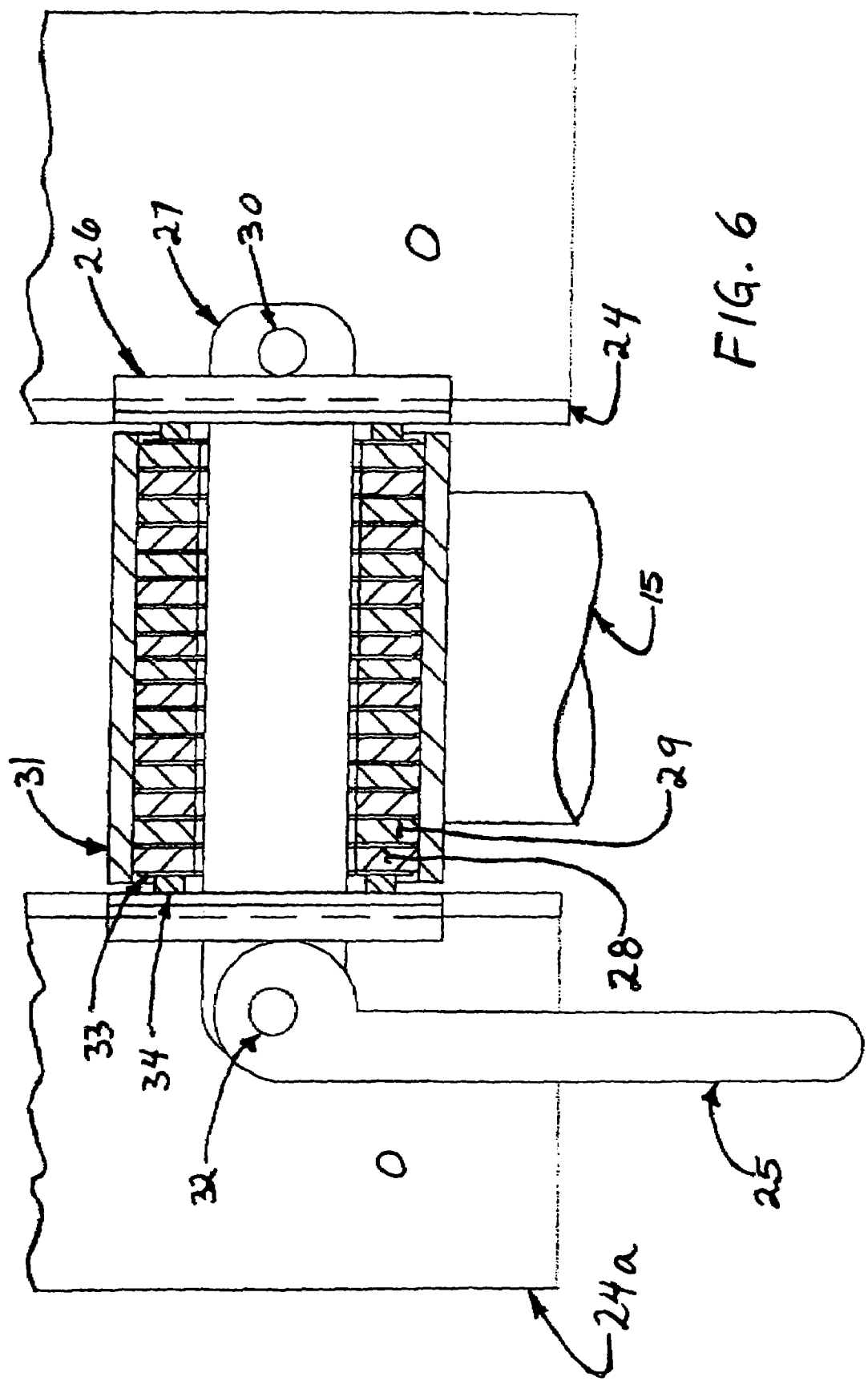
FIG. 6 is cross-sectional view A—A of the chair shown in FIG. 2.

As shown in FIG. 5, chest support 13 is attached to main rail 15 by a multi-disk friction clamp that allows the chest support to be raised and lowered as well as rotated relative to main rail 15. Housing 31 is rigidly attached to main rail 15. The square outer lock disks 29 are rotationally constrained by the square shape of housing 31 while allowing lock rod 27 to rotate freely inside the large center hole of outer lock disks 29. Round inner lock disks 28 are rotationally keyed to lock rod 27 by their rectangular center hole and free to rotate within housing 31. Inner and outer lock disks 28 and 29 may be alternately arranged over lock rod 27 face to face as shown in FIG. 5 or a shim washer 33 may be placed between each pair of lock disks as shown in FIG. 6.

The shim washers 33 have an outside diameter and an inside diameter that allow them to rotate freely inside the housing 31 and on lock rod 27. The shim washers 33 are made from a material dissimilar to the lock disks 28 and 29 and aid in preventing galling between lock disks 28 and 29. Plastic washers 34 transmit clamping force to the lock disks 28 and 29 and shim washers 33 as well as space the chest support brackets 24 away from the housing 31 to prevent scraping when the chest support brackets 24 are moved.

The chest support brackets have a slot in them that allows them to slide over lock rod 27 but not rotate relative to lock rod 27. Clamp plates 26 are prevented from rotating about lock rod 27 by their close fitting rectangular hole and they have a bent portion that bears on the edge of chest support brackets 24. The bent portion of clamp plate 26 acts as a cam to force lock rod 27 and chest support bracket 24 tightly together when clamping pressure is applied, thus eliminating play between the brackets and rod. Pin 30 is pressed into lock rod 27 and transmits clamping force to clamp plate 26 when locking lever 25, which is pivotally connected to the other end of lock rod 27, is in the locked position as shown in FIG. 6. Locking lever 25 has a cam shape that allows movement of the lever to apply or release clamping force to clamp plates 24, chest support brackets 24, plastic washers 34, shim washers 33 (optional), inner lock disk 28 and outer lock disks 29. When clamping pressure is applied to inner and outer lock disks 28 and 29 friction prevents them from rotating relative to one another which in turn prevents lock rod 27 from rotating relative to housing 31. Furthermore the friction between clamp plates 26 and chest support brackets 24 will prevent the chest support brackets 24 and chest support 13 attached to it from sliding or rotating relative to housing 31 and hence seat 14. When the clamping force is released by moving locking lever 25 to the unlocked position all friction forces are reduced to the point that chest support 13 may be easily rotated or slid up and down relative to seat 14.

Face rest 11 is attached to chest support 13 such that it may be slid longitudinally in the plane of the chest support 13 closer to or further from chest support 13. Face rest 11 may also be rotated about point 43 by operating locking lever 42. The adjustment mechanism of face rest 11 is described in further detail in U.S. Pat. No. 5,427,436 and U.S. patent application Ser. No. 09/599,290, filed Jun. 21, 2000 both of which are hereby incorporated by reference in their entirety.

Figure 7:
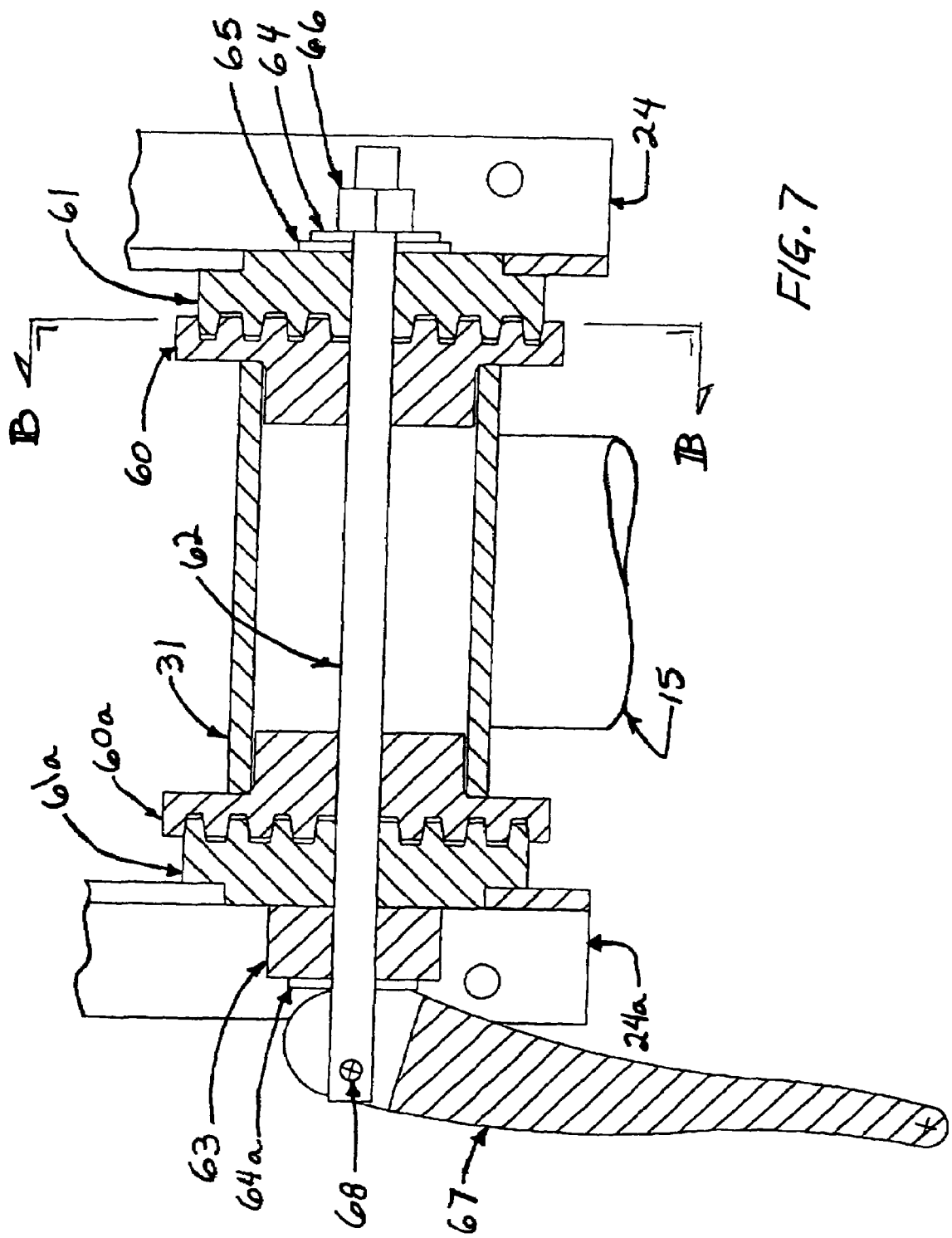
FIG. 7 is a partial cross-sectional view of an alternate type of frictional clamp.
Figure 8:
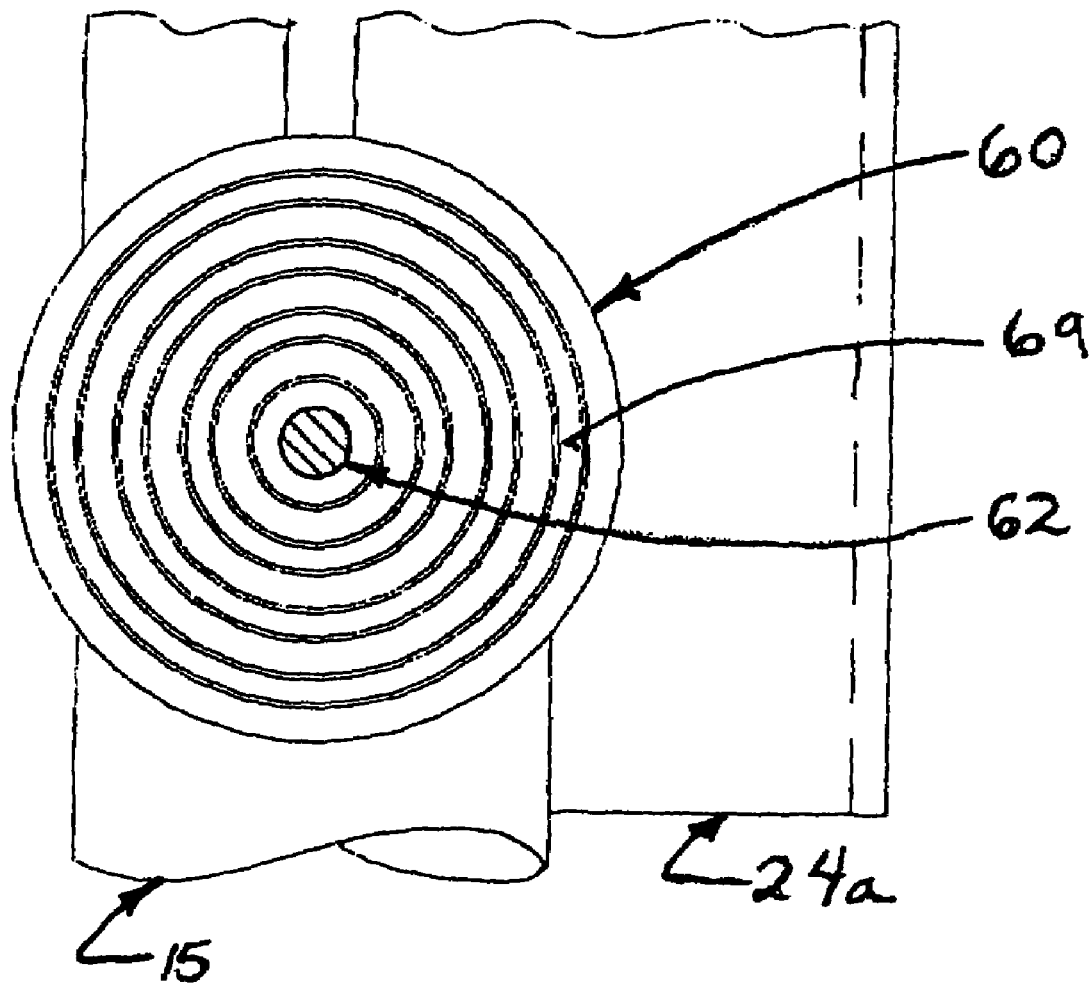
FIG. 8 is a partial cross-sectional view of the clamp shown in FIG. 7.
Figure 9:
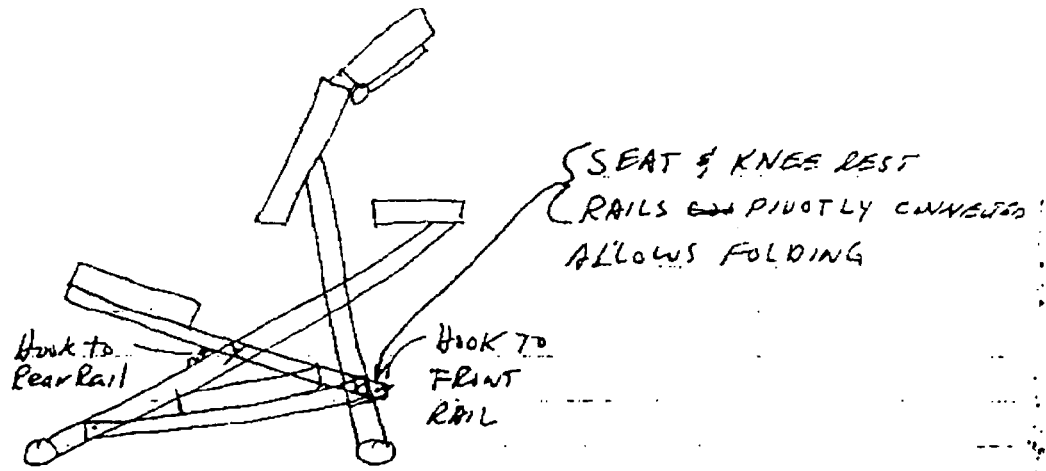
FIGS. 9–13 are schematic views of alternative chair designs.
Figure 10:
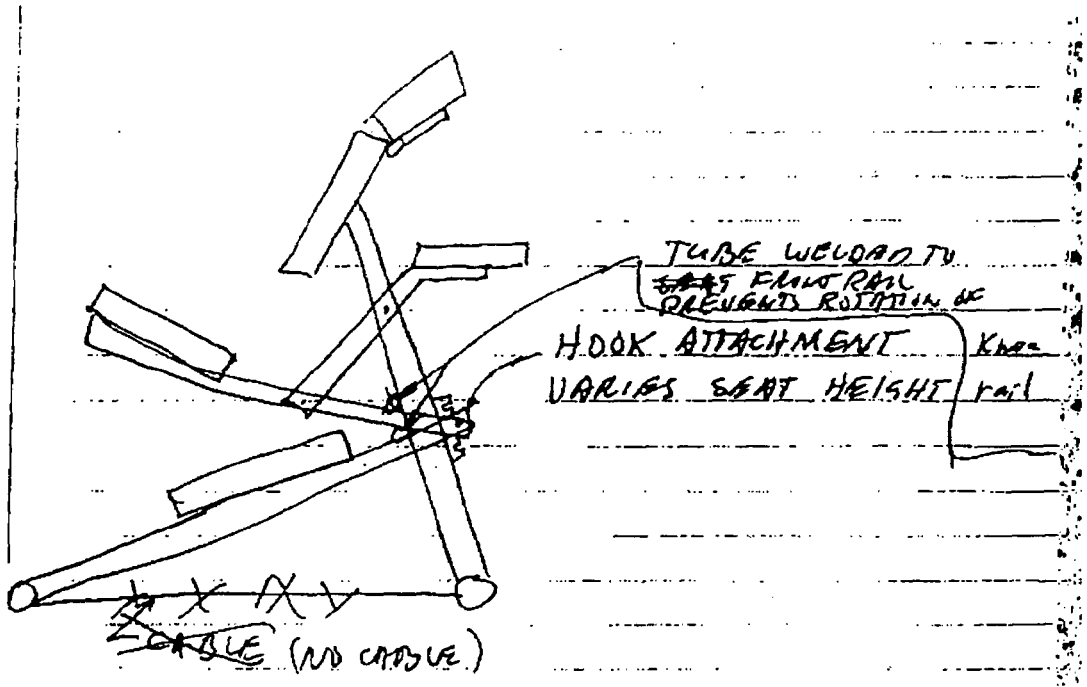
Figure 11:
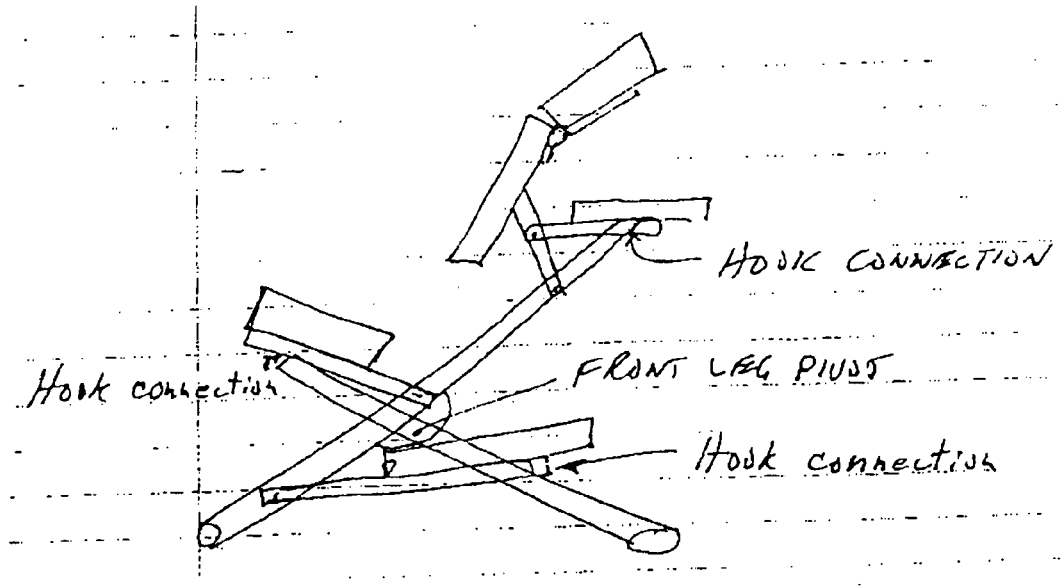
Figure 12:
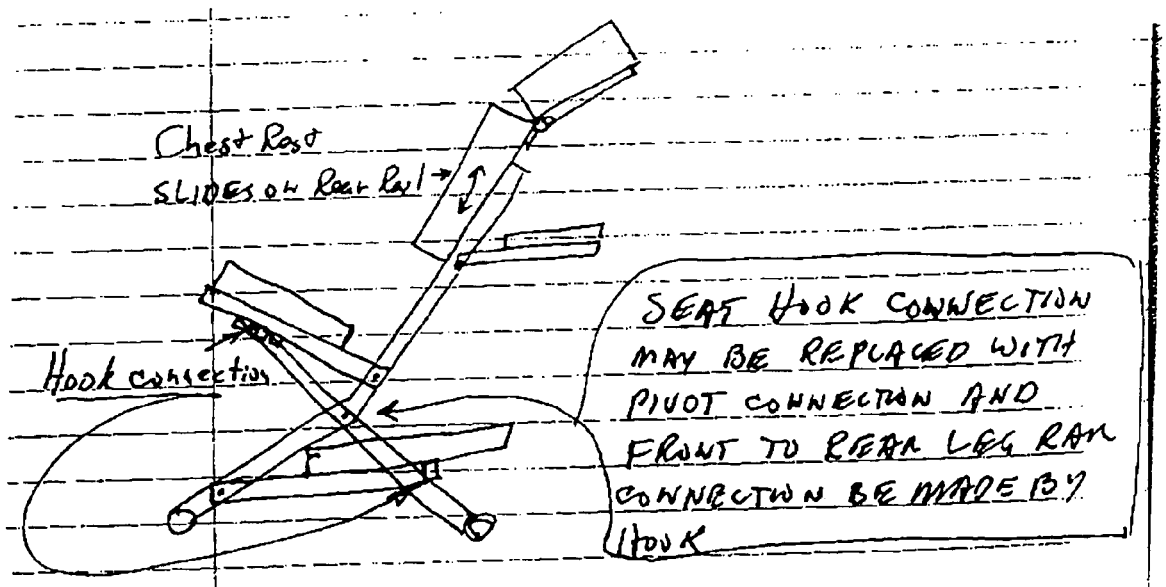
Figure 13:
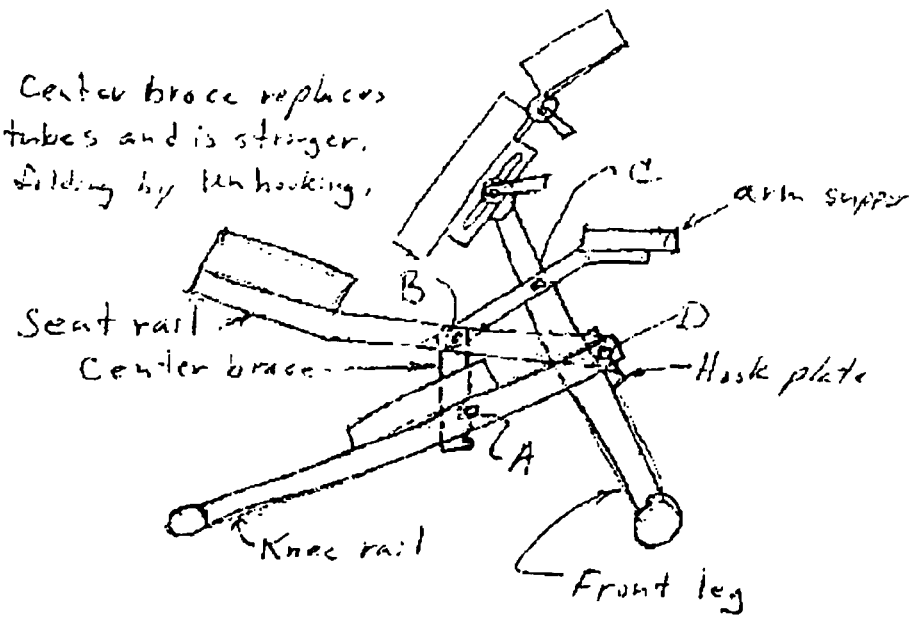

FIG. 7 shows an alternative type of lock disks 60 and 61 which serve the same function as lock disks 28 and 29 shown in FIG. 6. Inner lock disks 60 and 60a have a square-shaped protrusion that fits into the inside of square housing 31 thereby preventing rotation of these lock disks relative to main rail 15. The outer surface of lock disks 60 shown in FIG. 8 has concentric tapered grooves 69, which mate with concentric tapered tongues on lock disks 61. Lock disks 60a and 61a are similarly configured. Outer lock disks 61 and 61a each have a rectangular protrusion that fits slidably into the slots on chest support brackets 24 and 24a respectively. Thus outer lock disks 61 and 61a are prevented from rotating relative to the chest support brackets and hence chest support 13. Lock rod 62 is pivotally attached to cam lever 67 by pin 68. Lock rod 62 runs through washer 64a, spacer 63, the slot in bracket 24a, lock disks 61a and 60a, housing 31, lock disks 60 and 61, the slot in bracket 24, plastic washer 65 and washer 64. Nut 66 is threaded onto lock rod 62 and is adjusted to provide an appropriate clamping force to the components the rod runs through when cam lever 67 is in the locked position as shown in FIG. 7. When clamping pressure is applied by cam lever 67 the frictional forces between the tapered tongues and grooves of the mating lock disks prevent them from rotating relative to each other and hence prevent chest rest 13 from rotating relative to main rail 15. The tapered shape of the tongues and grooves allows a smaller clamping force to result in a greater frictional force similar to the action of a cone clutch. The frictional force between the lock disks 61a and 61 and the brackets 24a and 24 prevent the brackets from sliding longitudinally relative to the disks when the clamping pressure is applied. Thus when the cam lever is in the locked position chest support 13 is prevented from rotating or sliding relative to main rail 15. When the cam lever is moved to the unlocked position, the clamping force is reduced to the point where frictional forces may be easily overcome and chest support 13 may be rotated or slid longitudinally relative to main rail 15.

Alternate chair designs are shown in the Appendix attached hereto.

Although the invention has been disclosed in its preferred forms, the specific embodiments thereof as disclosed and illustrated herein are not to be considered in a limiting sense, because numerous variations are possible. Singular terms used herein do not preclude the use of more than one of the associated element, and embodiments utilizing more than one of a particular element are within the spirit and scope of the invention. Applicant regards the subject matter of his invention to include all novel and nonobvious combinations and subcombinations of the various elements, features, functions, and/or properties disclosed herein. The following claims define certain combinations and subcombinations of features, functions, elements, and/or properties that are regarded as novel and nonobvious. Other combinations and subcombinations may be claimed through amendment of the present claims or presentation of new claims in this or a related application. Such claims, whether they are broader, narrower, equal, or different in scope to the original claims, also are regarded as included within the subject matter of applicant's invention.

I claim:

1. A chair comprising
a first rigid support structure,
a seat connected to the first support structure,
a second rigid support structure crisscrossingly connected to the first support structure such that the first and second supports form an X configuration when the chair is set up in a use position, and may be pivoted toward a substantially parallel configuration in a compact position for storage or transport,
a locking knee support structure fixedly connectable to the first and second support structures to form a rigid triangular configuration stabilizing the chair in its use position, wherein the locking structure can be disconnected from at least one of the support structures allowing the support structures to pivot into the compact position, and
guide plates defining a plurality of slots under the knee support structure for receiving a pivot rod connected to the first support structure, the effective length of the knee support structure between first and second support structures being adjustable by locating the pivot rod in different slots, thereby changing the seating orientation of the chair.

2. The chair of claim 1, wherein the locking structure carries a at least one knee support pad.

3. The chair of claim 1, wherein the locking structure is pivotally connected to the first support structure.

4. The chair of claim 1, wherein the locking structure is pivotally connected to the second support structure.

5. The chair of claim 1 further comprising
a chest rest attached to the second support structure.

6. The chair of claim 5, wherein the position of the chest rest relative to the second support structure is adjustable.

7. The chair of claim 6, wherein the chest rest is attached to the second support structure via a multi-disc friction clamp.

8. The chair of claim 5 further comprising
a face rest attached to the chest rest.

9. A chair comprising
plural leg structures,
a seat connected to at least one of the leg structures,
a chest rest assembly connected to a first leg structure for supporting a person in a forward leaning position, the chest rest assembly having a chest support connected to an adjustment device that allows adjusting of the orientation of the chest support relative to the first leg structure, the adjustment device including an alternating series of circular and rectangular disks, the rectangular disks having a keyed orientation relative to the first leg structure, the circular disks having a keyed orientation relative to the chest support, and a clamp device that locks and unlocks relative movement of the rectangular and circular disks relative to each other.

10. The chair of claim 9, wherein the adjustment device has a handle for providing manual control of the clamp device.

11. The chair of claim 9, wherein the adjustment device permits longitudinal and rotational movement of the of the chest support when the clamp device is unlocked.

12. The chair of claim 9, wherein the first and second disks having interlocking circular groove and ridge patterns which frictionally engage each other when the clamp device is in a locking position.

13. The chair of claim 9, wherein the first leg structure is crisscrossingly connected to a second leg structure such that the first and second leg structures form an X configuration when the chair is set up in a use position, and may be pivoted toward a substantially parallel configuration in a compact position for storage or transport.

14. The chair of claim 13 further comprising
a locking structure connectable to the first and second leg structures to form a rigid triangular configuration stabilizing the chair in its use position, wherein the locking structure can be disconnected from at least one of the leg structures allowing the leg structures to pivot into the compact position.

15. The chair of claim 14 further comprising
at least one knee support pad connected to the locking structure.

* * * * *